United States Patent [19]

Bensoussan et al.

[11] Patent Number: 5,025,134
[45] Date of Patent: Jun. 18, 1991

[54] MEANS FOR REFRESHING A TRIAC CONTROL CIRCUIT POWER SUPPLY

[76] Inventors: David Bensoussan, 5170 Hingston, Montreal, Canada, H3X 3R4; Don Tardio, 6631 Paul-Pau, Montreal, Canada, H1K 4R7

[21] Appl. No.: 465,734

[22] Filed: Jan. 16, 1990

Related U.S. Application Data

[63] Continuation-in-part of Ser. No. 355,209, May 22, 1989, abandoned.

[30] Foreign Application Priority Data

May 24, 1988 [CA] Canada .................................. 567546

[51] Int. Cl.[5] .......................... H05B 1/02; G05F 1/45
[52] U.S. Cl. ..................................... 219/494; 219/499; 219/501; 323/236; 323/319
[58] Field of Search ............... 323/235, 239, 245, 319, 323/324, 236; 219/499, 501, 494; 307/647, 117, 132 T

[56] References Cited

U.S. PATENT DOCUMENTS

| | | | |
|---|---|---|---|
| 3,881,118 | 4/1975 | Forrest et al. ........................ | 323/319 |
| 4,024,457 | 5/1977 | Riddle .................... | 307/647 |
| 4,274,045 | 6/1981 | Goldstein ...................... | 323/319 |
| 4,374,321 | 2/1983 | Cunningham ....................... | 219/501 |
| 4,504,778 | 3/1985 | Evans ...................... | 323/324 |
| 4,554,439 | 11/1985 | Cross et al. ........................... | 219/501 |
| 4,623,969 | 11/1986 | Bensoussan et al. ................. | 364/505 |
| 4,678,985 | 7/1987 | Moskin ................... | 323/324 |
| 4,745,300 | 5/1988 | Kammerer et al. .................. | 323/324 |
| 4,878,010 | 10/1989 | Weber ...................... | 323/324 |

FOREIGN PATENT DOCUMENTS

| | | |
|---|---|---|
| 797079 | 10/1968 | Canada . |
| 1009339 | 4/1977 | Canada . |
| 1035448 | 7/1978 | Canada . |
| 1217544 | 2/1987 | Canada . |
| 2491692 | 10/1981 | France . |
| 47129 | 4/1981 | Japan ................................... 323/324 |

*Primary Examiner*—William H. Beha, Jr.
*Attorney, Agent, or Firm*—Darby & Darby

[57] ABSTRACT

An electronic controller comprising two input terminals between which an AC line and an electrical load are connected in series. A processing unit generates a command signal to control the supply of electrical power to the electrical load which closes an electronic switch also connected between the two input terminals for connecting the AC line and the load in series in a closed loop. A power supply voltage of the controller is provided by a second power supply derived from the two input terminals, consequently from the AC line through the load when the switch is open. When the command signal is generated, an electronic circuit opens the switch which is normally closed by this command signal to maintain the power supply voltage of the controller according to an adequate standard of operation. To energize the controller, the opening of the switch is activated in a temporary and repetitive manner for a certain whole number of cycles of the sector. This opening is whether periodic or occurs while the power supply voltage of the controller transits underneath a predetermined threshold value.

7 Claims, 3 Drawing Sheets

MEANS FOR REFRESHING A TRIAC CONTROL CIRCUIT POWER SUPPLY

This is a continuation-in-part of application Ser. No. 355,209, filed May 22, 1989, now abandoned.

BACKGROUND OF THE INVENTION

The present invention relates to a control system which is operated by means of a power supply system derived from a supply voltage switched to a load. It allows a controller to be kept in operation without any need of an additional wire or batteries. It is particularly suited for electronic thermostats connected to electrical loads, allowing the connection of an electronic switch and a temperature controller by means of only two wires.

The electronic thermostats currently on the market use electronic switches such as thyristors or triacs to connect or disconnect the AC line with a heating element. Such systems require three wires connected to the thermostats to be operative. Two wires energize the thermostat from the AC line voltage, the first wire being connected to one extremity of a heating element whereas the second extremity of the heating element is connected to the other extremity of the electronic controller.

According to the invention, only two wires are needed for connecting the electronic thermostat to a heating element. A regulating system provides a stabilized power supply which is used for activating the electronic controller in a continuous manner. The stabilized power supply is regulated during the periods during which the heating element is not activated. However, if the heating element must be activated for a long period of time, an electronic device disconnects the AC line from the heating element when necessary and during a certain number of alternating cycles to accumulate energy and maintain the stabilized power supply at an acceptable standard of operation.

The present invention prevents the use of a battery as it is the case, for example, in the Canadian patent no. 1,035,448 (LAMBERT) granted on July 25th, 1978, or the use of an emergency battery as proposed in the French patent no. 2,491,692 (KABAT) published on Apr. 9th, 1982. In many cases, the present invention prevents the need for installing a third wire in walls where the system in place provides only two wires. It also prevents the need for modulating control pulses over the power supply wires energizing the thermostat, which produces several transients on the line. The present invention is different from the bridge configurations suggested in the Canadian patent no. 1,217,544 (CROSS et al.) granted on Feb. 3rd, 1987 and wherein the thermostat is connected directly on the radiator. It can also be used in cooling or heating systems such as described in the Canadian patent no. 797,079 (RAY) granted on Oct. 22nd, 1968.

The present invention is also different from the inventions based on the method known as "phase angle control" and that is mentioned in the patents of Kammerer et (U.S. Pat. No. 4,745,300), Evans (U.S. Pat. No. 4,504,778), Kompelien (U.S. Pat. No. 4,328,528), Goldstein (U.S. Pat. No. 4,274,045. and Sankusu et al (Japanese patent no. 47 129).

The method used in the above mentioned patents comprises a step of interrupting the supply of the load during a certain portion of the phase of the alternating half-cycle. It is the level of a voltage threshold value or of a predetermined angle that determines the phase at which the supply is ended, and at which the supply of the load is triggered.

This method has several drawbacks that limit its practical realization. The interruptions of the power supply produce many transients on the line, and emit electromagnetic interference. The interference or the transients are important in so far as the ohmic value of the load is low. Moreover, the current used to supply the controller is dependant upon the ohmic value of the load and consequently, the energy available for the controller depends on the impedance of the load.

Another drawback results from the fact that the commutation phase of each half-cycle being relatively low, the energy accumulated for supplying the controller is limited to a low value which limits the consumption, and therefore the applications of the controller.

According to the present invention, the commutation of the supply of the load is synchronized at the zero crossing of the sector voltage, and allows a supply of large power loads without producing transients or interferences, and to maintain a sufficient amount of energy for the needs of the controller. Therefore, the present method does not depend upon the voltage level of the threshold or the phase of the sector power supply.

The present invention also differs from the U.S. Pat. No. 4,678,985 of Moskin, which necessitates the use of a transformer. The present invention also differs from the U.S. Pat. No. 4,374,321 of Cunningham Jr et al., which relates to a photocopying machine in which the interruptions of the power supply are not used for supplying the controller. The present invention also differs from U.S. Pat. No. 3,881,118 of Forest in which there is no control of the number of cycles used to charge the controller. The invention disclosed in U.S. Pat. No. 4,554,439 of Cross et al., in which the two wires available for the controller are for the power supply only when the load is included in the controler, the load being in fact connected in parallel with the controller also differs from the present invention. This is not the case in the present invention where two wires are available, one of these wires coming from the power supply and being connected in series with a load, the other wire coming from the load.

More particularly, the present invention relates to an electronic controller for controlling a supply of electrical power issued from a first power supply to an electrical load, comprising:

two input terminals between which said first power supply and said load can be connected in series;

an electronic switch connected between said two input terminals;

means for generating a command signal to control said supply of electrical power to said electrical load;

means for closing said electronic switch in response to said command signal to connect said two input terminals by means of said switch in such a manner that said first power supply is connected in series with said load in closed loop and thus supplies said electrical power to said load;

a second power supply for generating a power supply voltage of said electronic controller, said second power supply being derived from said two input terminals and consequently from said first power supply through said electrical load when said switch is open; and means for opening in a temporary and repititive manner, for a whole number of power supply cycles from said first power supply, said switch in response to said command signal which normally produces a closure of said switch by said means for closing so that said power supply voltage generated by said second power supply, derived from said first power supply when said switch is open, is maintained according to an adequate standard of operation for energizing said electronic controller.

Thus, there are provided means for accumulating the sufficient energy at the controller when the commutation is open during a certain whole number of cycles of the sector power supply, and means for supplying the controller during a certain whole number of cycles of the sector power supply when the commutator is closed, this latter period being much more longer than the period for accummulating energy.

Preferably, the present invention comprises means for providing a switching only when the supply voltage of the AC line crosses zero volt to prevent transients on the line or electromagnetic interference.

BRIEF DESCRIPTION OF THE DRAWINGS

The attached drawings which illustrate a preferred embodiment of the invention are.

The objects, advantages and other features of the present invention will become more apparent upon reading of the following non restrictive description of a preferred embodiment, given for the purpose of examplification only with reference to the accompanying drawings.

DETAILED DESCRIPTION OF A PREFERRED EMBODIMENT

Figure 1:
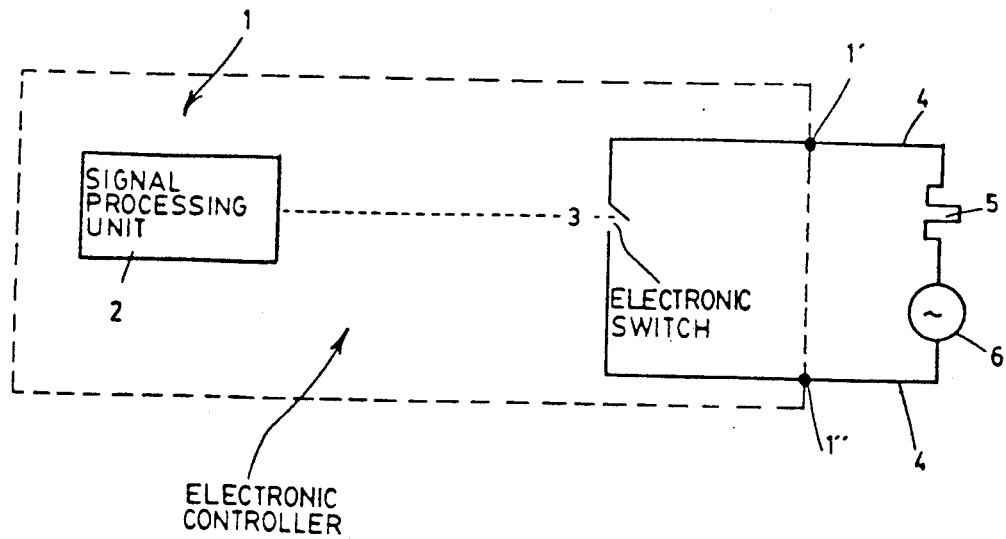
FIG. 1 is a block diagram of the power switching of a given load by the electronic controller of the present invention.

In FIG. 1, there are shown the functional elements of the invention which comprises an electronic controller 1 including a signal processing unit 2 that controls the switching of an electronic switch 3. The electronic switch 3 dictates whether an open circuit or a closed circuit for the two connection wires 4 which are connected in series to a heating element 5 and the AC line 6 between the input terminals 1' and 1" of the controller, and can have an adequate length to allow a remote control for the supply of electrical power to the element 5. Thus, the heating element 5 is electrically energized when the electronic switch 3 is in a closed position, and the AC line 6 is disconnected from the heating element 5 when the electronic switch 3 is in an open position, this electronic switch being always open or closed for a whole number of power supply cycles of the sector.

Figure 2:
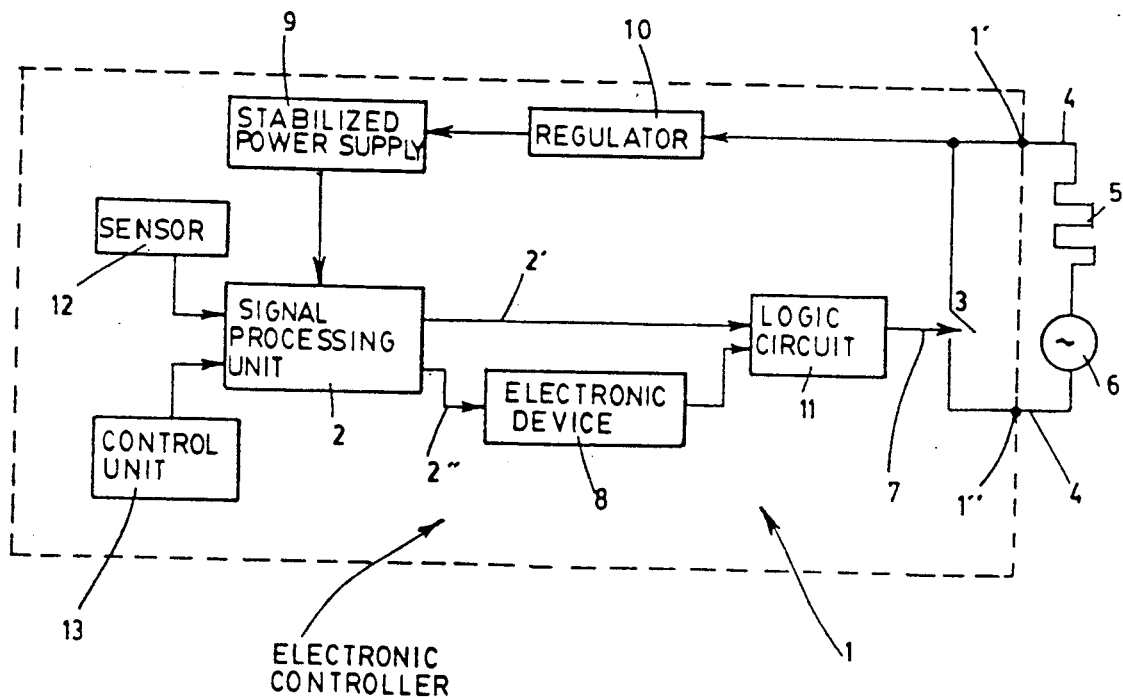
FIG. 2 is a block diagram of the electronic controller in FIG. 1.

The FIG. 2 represents a block diagram showing the principal elements of the present invention when it is applied to a controller of a dissipating power device. For example, there will be described, in the following description, the case where a thermostat controls a radiator. The switch 3 will be closed upon detection of a signal from the logical gate 35, and will be open at zero crossings of the voltage of the sector 6. The logical gate 35 will send a closing signal to the switch 3 so that the radiator 5 is energized and heat is generated, only when the three inputs of the logical gate 35 will be activated which means:

1) when the logical processing unit 2 will decide that heating is needed by comparing the ambient temperature detected by the sensor 7 and a reference temperature established by the control unit 8;

2) when the zero crossing detector 9 detects a sector voltage that is sufficiently low so that the closure of the switch 3 is done at zero volt to prevent production of electromagnetic interference; and 3) when the threshold detector detects that the power supply voltage at the output of the regulator is above a predetermined minimum voltage. If it is not the case, the output of the threshold detector will be deactivated and the switch 3 will be open at the next zero crossing of the sector power supply for a small whole number of cycles so that the regulator 10, which is supplied by the sector voltage available at the terminals of the switch 3, has a sufficient period of time for recharging itself at a supply voltage determined by the threshold detector 11.

It can be noted that the regulator 10 can rapidly accumulate energy, via the power supply of the sector 6, and slowly discharge this energy into the logical processing unit 2.

More specifically, when a continuous heating is needed, in accordance with the conditions established by the temperature sensor 7 and the control unit 8, the zero crossing detector will trigger the switch 3 after each half-cycles of the power supply of the sector 6 in such a way that the triggering is done very close to zero volt whereas the threshold detector will trigger a temporary opening of the switch 3 so that the regulator 10 has sufficient power for supplying the logical processing unit 2, and so that the regulator 10 has a sufficient period of time for recharging itself at its maximum value.

Figure 3:
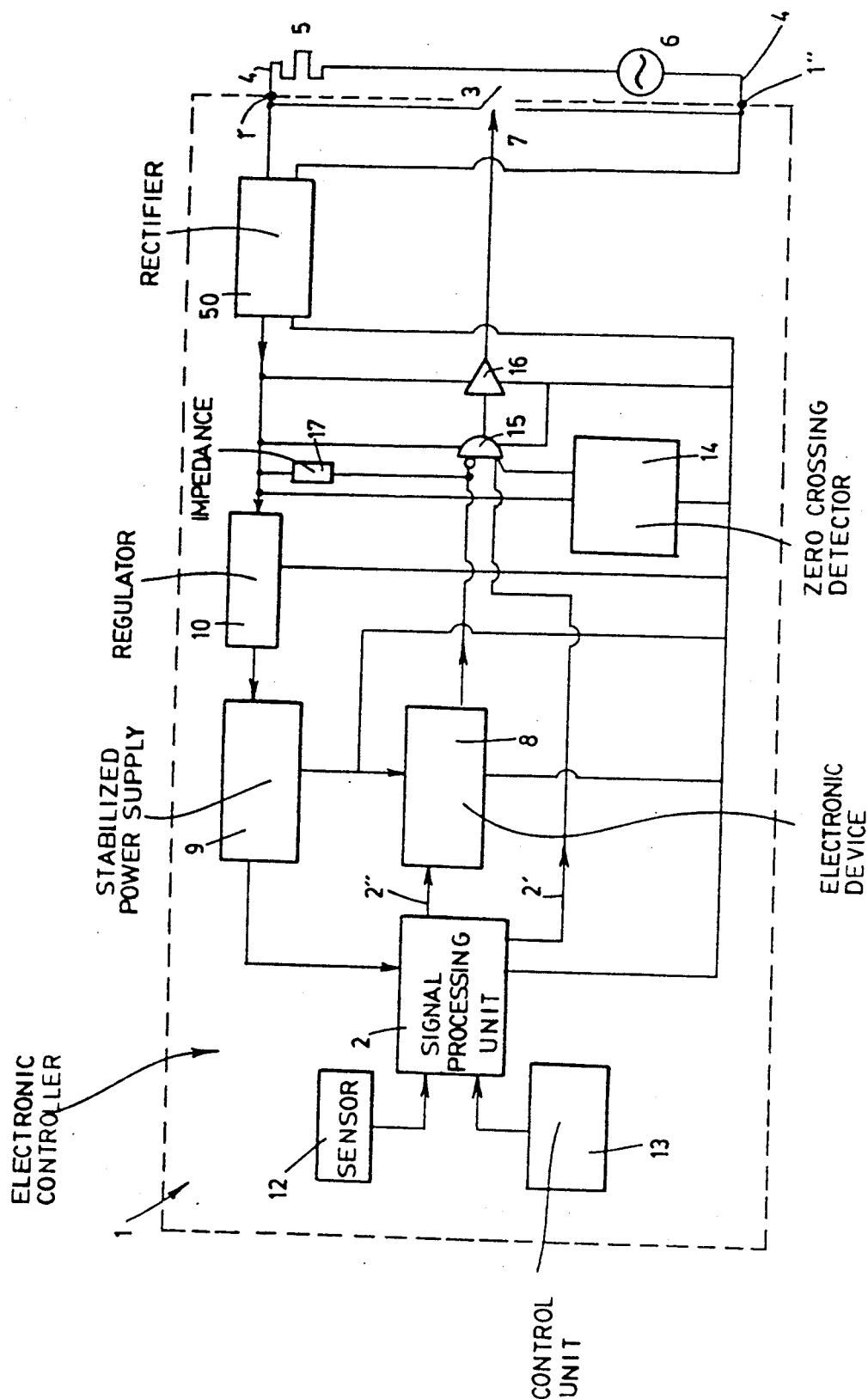
FIG. 3 is a schematic diagram showing a system for adequately controlling a thermostat according to the present invention.

When the present invention is applied to heating, the relation between the opening period of the switch 3, controlled by the threshold detector 11, and the closing period of the switch 3 is proportional to the consumption current of the logical processing unit, which can have a low value as it will be shown in the description of the FIG. 3. The recharging and heating period of time are defined by whole numbers of cycles of the sector power supply.

If the current consumption of the logical processing unit 2 is constant then the threshold detector can be replaced by a clock that periodically sends a signal, having a time period defined by a whole number of cycles of the voltage of the sector 6, and controlling the opening of the switch 3 to recharge the regulator 10.

Referring now to FIG. 3, there is shown an example of realization of the electronic circuit. The wires 4 and 4' come from the sector 6 connected to the radiator 5, and are connected to the terminals 1' and 1" forming the two input contacts of the thermostat 1. The triac 33 closes the circuit comprising the sector 6 and the radiator 5 when a triggering voltage is applied across the resistor 32 connected in series with the diode bridge 31 which provides a rectified voltage for the rest of the circuit. This triggering voltage is provided by a high current produced by the closure of the SCR 29 which is itself controlled by the output 30' of the microprocessor 30 via the voltage divider 27 and 28.

The rectified voltage at the output of the diode bridge is applied to the terminals of the zero crossing detector 9 and to the regulator 10 via the diode 37. This diode 37 prevents the return of a continuous voltage drop from the regulator 10 at the terminals of the SCR 29.

The regulator 10 converts the alternating rectified voltage of 220 volts a.c. into a regulated direct voltage of 5 volts d.c. The regulator 10 is constituted of the components 12 to 17. The capacitor 12 has a large capacitance in the order of one tenth of a Farad to maintain a stable voltage allowing an adequate operation of the low power circuit 25. This capacitor 12 is charged to reach the power level of sector 6 when sector 6 is turned on and the capacitor maintains this charge until the power from the sector 6 is turned off. The voltage established by the zener diode 13 is regulated by the transistor 16 and the resistor 14 which control the supply current from the sector. The transistor 15 and the resistor 17 provide a conversion of 220 V a.c. into 5 V d.c. with minimal dissipation of power and heat, which is essential in the case of an autonomous thermostat.

The zero crossing detector 9 detects the rectified voltage of the sector and informs the microprocessor 30 of the imminence of a zero crossing of the sector, a time period of 100 usecond being sufficient, so that the microprocessor 30 can prepare the triggering of the SRC 29.

The reset circuit 34 is used when the sector 6 is turned on or off in order to energize or deactivate respectively the microprocessor 30 whether or not the power supply voltage of the low power circuit reaches a predetermined threshold. This circuit is important because it ensures that the output 30' will be at zero, therefore the voltage of the sector 6 will be at the terminals of the regulator 10 as long as the capacitor 12 will not reach the required power supply voltage for the low power circuit 25.

A temperature sensor 20 provides an electrical signal proportional to the ambient temperature in a room whereas the slider of the potentiometer 23 provides a voltage proportional to the desired temperature inside the room. The sign of the difference between these two voltages is determinal by the comparator 24 and transmitted to the microprocessor 30. The voltage across the resistor 14 provides a value proportional to the power supply voltage of the low power circuit 25 and is compared, via the comparator 26, to a reference voltage established by the zener diode 19, the sign of this comparison being sent to the microprocessor 30.

The transil diode 36 protects the circuit against the presence of a high voltage on the line 4' by short-circuiting the line 4' with the trigger of the triac to activate it, and therefore this noise is sent to the radiator.

In operation, the output of the comparator 24 informs the microprocessor 30 whether or not heating is needed. If heating is not needed, the output 30' of the microprocessor 30 will be maintain at zero. The energizing of the low power circuit 25 will be done by means of the rectified voltage supplied at the input of the regulator 10.

If heating is needed, the output 30' of the microprocessor 30 will be continuously activated as long as the threshold detector 9 will allow it.

The trigger voltage of the gate of the SRC 29 being continuously fed, the triac 33 which is deactivated at the zero crossing, will be immediately retriggered, which is important to prevent electromagnetic interferences that are proportional to the power load constituted by the radiator.

The energizing of the low power circuit 25 will be done by means of the capacitor 12. The comparator 26 informs the microprocessor 30 to cut off the triac 33 as soon as the power supply voltage of the low power circuit 24 is under a predetermined threshold. This operation loads the capacitor via the regulator 10 to a desired voltage determined by the comparator 26.

This loading period which corresponds to the opening of the triac, is relatively short with respect to the heating period which corresponds to the closure of the triac. For example, the low power circuit 25, shown on FIG. 3, having a steady current consumption of 1 mA under 5 V dc will need a loading period of one cycle of 60 Hz every nineteen cycles of 60 Hz of heating. In other words, the circuit comprising the sector 6 and the radiator 5 will be open during one cycle of 60 Hz every twenty cycles of 60 Hz, for an efficiency of 95%. This efficiency is inversely proportional to the consumption of the low power circuit 25. As the radiator does not actually operate at more than 95% in a continuous manner, this modulation is invisible for the consumer.

When the loading period of the capacitor 12 is terminated, as indicated to the microprocessor 30 by means of the comparator 26, the microprocessor 30 then waits for a signal from the zero crossing detector 9, which happens a short time before the voltage of the sector 6 crosses zero, to trigger the heating as soon as possible after the zero crossing. This triggering of the heating happens only at the zero crossing around 2 volts so that no radio interference is emitted.

Figure 4:
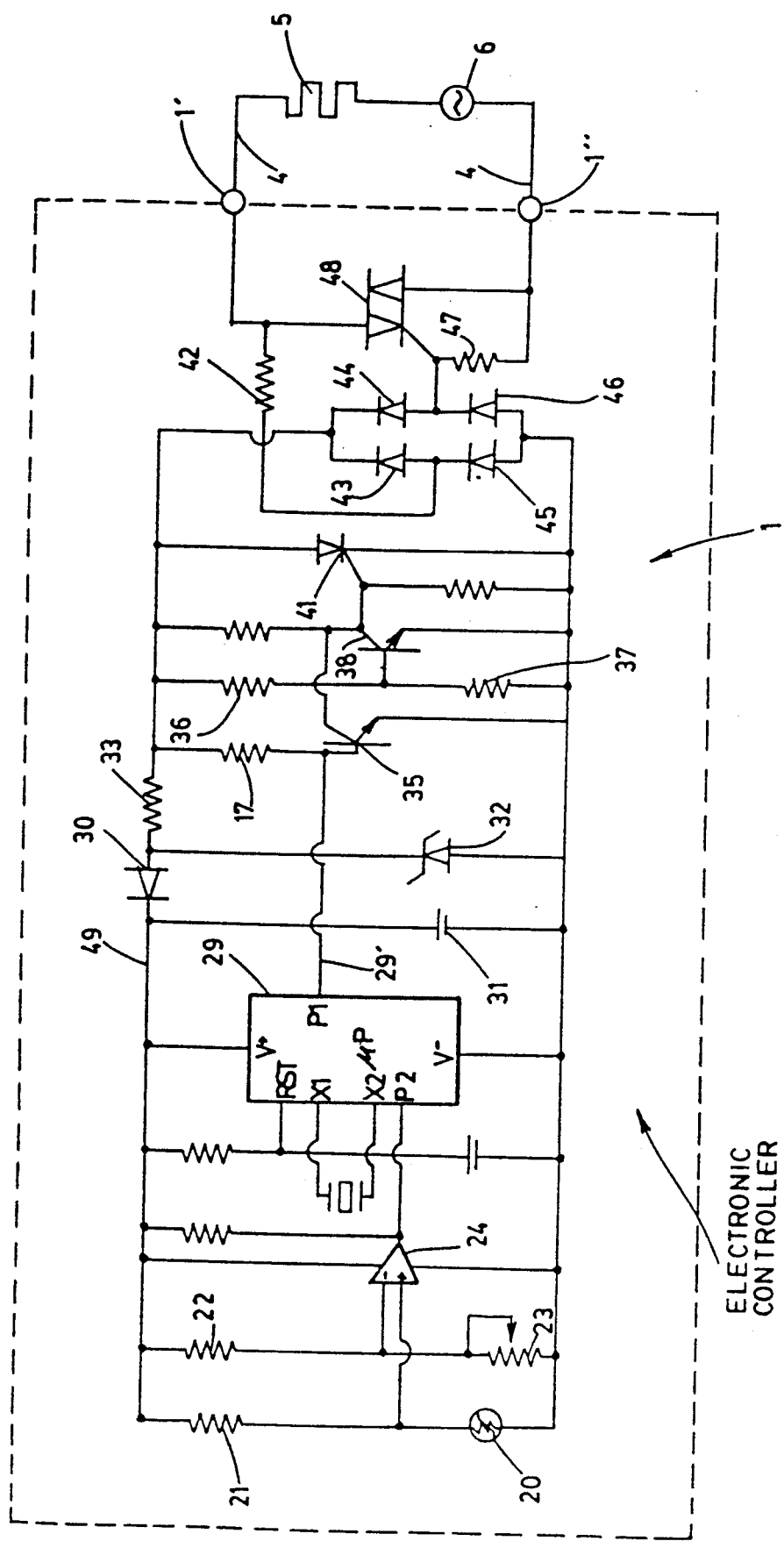
FIGS. 4(A), (B), and (C) show different voltage signals with respect to time, present respectively at the commutation command output of the controller according to the present invention (figure A), at the input of the regulator (figure B), and at the load (figure C).

The FIG. 4a represents this loading pulse, which is active when low, at the output 30' of the microprocessor 30, that lasts one cycle of 60 Hz every twenty cycles of 60 Hz. It can be noted that the low level happens a short time before the next zero of the sector to prevent another triggering of the triac 33 whereas the high level happens as soon as a zero crossing is detected by the zero crossing detector 9.

The FIG. 4b represents the consequence of this loading pulse at the terminals of the regulator 10 that will use the voltage available for loading the capacitor 12. The FIG. 4c represents the voltage at the terminals of the radiator 6 that heats with an efficiency of 95% in the present example. The current consumption of the low power circuit 25 shown on FIG. 3 being of the order of 400 uA, other devices can be added such as a display and other sensors.

Although the example of an electronic thermostat has been illustrated, the present invention can be applied to any power dissipating device for which a whole number of power supply cycles can be removed without disturbing its operation so that this whole number of power supply cycles can be used for energizing a controller according to the present invention.

Although, the present invention has been explained hereinabove by way of a preferred embodiment thereof, it should point out that any modifications to this preferred embodiment, within the scope of the appended claims is not deemed to change or alter the nature and scope of the invention.

The embodiments of the invention in which an exclusive property or privilege is claimed are defined as follows:

1. An electronic controller for controlling a supply of an alternating electrical power issued from a first power supply to an electrical load, comprising:
   (a) two input terminals between which said first power supply and said load can be connected in series;
   (b) an electronic switch connected between said two input terminals;
   (c) a second power supply for generating a power supply voltage for said electronic controller, said second power supply voltage being derived from said two input terminals and consequently from said first power supply through said electrical load when said switch is open, said second power supply being provided with means for storing electrical energy;
   (d) voltage detecting means having inputs connected to said means for storing electrical energy, and an output for generating a positive output signal when voltage across said means for storing electrical energy is higher than a predetermined voltage value;
   (e) a sensor for detecting a measurable physical parameter, and generating a positive output signal when said physical parameter is not within a range of predetermined values;
   (f) a zero crossing detector for detecting voltage provided by said first power supply and generating a positive output signal when said voltage of said first power supply crosses zero volt; and
   (g) means for generating a command signal to control said supply of electrical power to said electrical load, said means for generating having inputs connected respectively to outputs of said voltage detecting means, said sensor and said zero crossing detector, said command signal having a closing state which causes said electronic switch to close and connect said two input terminals by means of said switch only when said three positive output signals are received at said inputs of said means for generating, in such a manner that said first power supply is connected in series with said load in closed loop and thus supplies said electrical power to said load, said command signal further having a normally open state which causes said electronic switch to open for a whole number of power supply cycles from said first power supply so that said means for storing electrical energy of said second power supply is charged from said first power supply, said command signal being maintained in the open state as long as the three positive output signals are not generated.

2. An electronic controller according to claim 1, wherein said electrical load is a heating resistance and said physical parameter is temperature.

3. An electronic controller according to claim 2, wherein said electronic controller is a thermostat.

4. An electronic controller for controlling a supply of an alternating electrical power issued from a first power supply to an electrical load, comprising:
   (a) two input terminals between which said first power supply and said load can be connected in series;
   (b) an electronic switch connected between said two input terminals;
   (c) a second power supply for generating a power supply voltage for said electronic controller, said second power supply voltage being derived from said two input terminals and consequently from said first power supply through said electrical load when said switch is open, said second power supply being provided with means for storing electrical energy;
   (d) a sensor for detecting a measurable physical parameter, and generating a positive output signal when said physical parameter is not within a range of predetermined values;
   (e) a zero crossing detector for detecting voltage provided by said first power supply and generating a positive output signal when said voltage of said first power supply crosses zero volt;
   (f) a clock means having inputs connected to said first power supply, and an output for generating periodically a positive output signal having a time period defined by a whole number of cycles of said first power supply; and
   (g) means for generating a command signal to control said supply of electrical power to said electrical load, said means for generating having inputs connected respectively to outputs of said clock means, said sensor and said zero crossing detector, said command signal having a closing state which causes said electronic switch to close and connect said two input terminals by means of said switch only when said three positive output signals are received at said inputs of said means for generating, in such a manner that said first power supply is connected in series with said load in closed loop and thus supplies said electrical power to said load, said command signal further having a normally open state which causes said electronic switch to open for a whole number of power supply cycles from said first power supply so that said means for storing electrical energy of said second power supply is charged from said first power supply, said command signal being maintained in the open state as long as the three positive output signals are not generated.

5. An electronic controller according to claim 4, wherein said electrical load is a heating resistance and said physical parameter is temperature.

6. An electronic controller according to claim 5, wherein said electronic controller is a thermostat.

7. Thermostat for controlling a supply of an alternating electrical power issued from a first power supply to a heating resistance, comprising:
   (a) two input terminals between which said first power supply and said resistance can be connected in series;
   (b) an electronic switch connected between said two input terminals;
   (c) a second power supply for generating a power supply voltage for said thermostat, said second power supply voltage being derived from said two input terminals and consequently from said first power supply through said resistance when said switch is open, said second power supply being provided with means for storing electrical energy;
   (d) voltage detecting means having inputs connected to said means for storing electrical energy, and an output for generating a positive output signal when voltage across said means for storing electrical energy is higher than a predetermined voltage value;
   (e) a sensor for detecting ambient temperature, and generating a positive output signal when said temperature is lower than a predetermined temperature value;
(f) a zero crossing detector for detecting voltage provided by said first power supply and generating a positive output signal when said voltage of said first power supply crosses zero volt; and
(g) means for generating a command signal to control said supply of electrical power to said heating resistance, said means for generating having inputs connected respectively to outputs of said voltage detecting means, said sensor and said zero crossing detector, said command signal having a closing state which causes said electronic signal to close and connect said two input terminals by means of said switch only when said three positive output signals are received at said input of said means for generating, in such a manner that said first power supply is connected in series with said heating resistance in closed loop and thus supplies said electrical power to said resistance, said command signal further having a normally open state which causes said electronic switch to open for a whole number of power supply cycles from said first power supply so that said means for storing electrical energy of said second power supply is charged from said first power supply, said command signal being maintained in the open state as long as the three positive output signals are not generated.

* * * * *